United States Patent
Chao et al.

(10) Patent No.: US 8,203,655 B2
(45) Date of Patent: Jun. 19, 2012

(54) MULTIMEDIA TELEVISION SYSTEM

(75) Inventors: Shen-Chin Chao, Chung Ho (TW); Chih-Chen Huang, Chung Ho (TW)

(73) Assignee: Amtran Technology Co., Ltd., Taipei County (TW)

( * ) Notice: Subject to any disclaimer, the term of this patent is extended or adjusted under 35 U.S.C. 154(b) by 995 days.

(21) Appl. No.: 12/145,165

(22) Filed: Jun. 24, 2008

(65) Prior Publication Data

US 2008/0295143 A1 Nov. 27, 2008

Related U.S. Application Data

(63) Continuation-in-part of application No. 11/802,205, filed on May 21, 2007, now Pat. No. 8,026,984.

(51) Int. Cl.
*H04N 5/60* (2006.01)
*H04N 5/44* (2006.01)

(52) U.S. Cl. ........................ 348/738; 348/553

(58) Field of Classification Search .................. 348/738, 348/725, 731, 553, 552; 381/307, 306, 80, 381/81, 119, 333; 725/100, 131, 139, 151, 725/153, 141, 133; *H04N 5/60, 5/44*
See application file for complete search history.

(56) References Cited

U.S. PATENT DOCUMENTS

2002/0146139 A1* 10/2002 Oplinger ....................... 381/306
2002/0149704 A1* 10/2002 Kano et al. ..................... 348/738

* cited by examiner

*Primary Examiner* — Sherrie Hsia
(74) *Attorney, Agent, or Firm* — Morris Manning & Martin LLP; Tim Tingkang Xia, Esq.

(57) ABSTRACT

A multimedia television system is disclosed. The multimedia television system comprises a receiver, a detector, an audio processing/controlling device, and a mixing device. The receiver receives an audio/video signal comprising an audio signal and a video signal and outputs the audio signal and the video signal respectively. When an external upgrading/transmitting device is connected to the detector, the detector will generate an upgrading signal. When the audio processing/controlling device receives the upgrading signal, the audio processing/controlling device will process the audio signal into a multi-channel audio signal comprising front sub-audio signals and rear sub-audio signals according to the upgrading signal. Then, the mixing device processes the rear sub-audio signals into at least one mixed audio signal. The detector receives the at least one mixed audio signal and transmits the at least one mixed audio signal via the external upgrading/transmitting device.

20 Claims, 8 Drawing Sheets

MULTIMEDIA TELEVISION SYSTEM

This is a continuation-in-part of application Ser. No. 11/802,205 filed May 21, 2007 now U.S. Pat. No. 8,026,984.

BACKGROUND OF THE INVENTION

1. Field of the Invention

The invention relates to a multimedia system. In particular, the invention relates to a multimedia television system which can playback an audio/video signal.

2. Description of the Prior Art

In recent years, with the vigorous development of various electronic products, multimedia systems, such as a home theater, have become more and more popular. In a multimedia system, except a monitor for displaying images, the most important hardware is a stereo. Taking a 5.1-channel stereo for example, it comprises a left loudspeaker, a right loudspeaker, a middle loudspeaker, a left rear loudspeaker, a right rear loudspeaker, and a bass loudspeaker. The loudspeakers are located at appropriate locations and directions and allowed to playback different or the same audio signals. By doing so, a user using the multimedia system can experience stereophonic sound effects.

Although the multimedia system can provide sound effect better than that of a conventional 2-channel stereo, the complicated connecting lines between these loudspeakers always make users inconvenient. In addition, the connecting lines with considerable length are not pleasing to the eye. In order to solve this problem, a multimedia system transmitting an audio signal in a wireless way between an audio processing/controlling device and parts of loudspeakers was provided. However, the multimedia system is already a 5.1-channel stereo and a transmitter must be embedded in the audio processing/controlling device to wirelessly transmit audio signals to parts of loudspeakers. It is inconvenient for users that he/she can not freely choose to use the multimedia system only as a conventional 2-channel stereo or upgrade the multimedia system to be a 5.1-channel stereo.

SUMMARY OF THE INVENTION

In order to solve the above problems, the invention provides a novel multimedia system. The multimedia system according to the invention can transmit an audio signal in a wireless way between an audio processing/controlling device and parts of loudspeakers. A user can easily upgrade a conventional 2-channel stereo multimedia system to a 5.1-channel stereo multimedia system only by inserting an upgrading/transmitting card into the multimedia system. In addition, the upgrading/transmitting card can also be used for wirelessly transmitting the audio signal from the audio processing/controlling device to the loudspeakers.

According to the invention, a preferred embodiment is a multimedia television system. The multimedia television system comprises a receiver, a detector, an external upgrading/transmitting device, a video playback apparatus, an audio processing/controlling device, M front loudspeakers, a mixing device, a first antenna, and a rear audio playback apparatus.

The receiver is used to receive an audio/video signal comprising an audio signal and a video signal and output the audio signal and the video signal respectively. The video playback apparatus is coupled to the receiver and is used to receive and display the video signal outputted by the receiver.

When the external upgrading/transmitting device is connected to the detector, the detector generates an upgrading signal. The audio processing/controlling device is coupled to the receiver and the detector. When the audio processing/controlling device receives the upgrading signal from the detector, the audio processing/controlling device receives the audio signal from the receiver and processes the audio signal into a multi-channel audio signal according to the upgrading signal. The multi-channel audio signal comprises M front sub-audio signals and N rear sub-audio signals, wherein M and N are positive integers. The audio processing/controlling device outputs the M front sub-audio signals and the N rear sub-audio signals respectively.

The mixing device is coupled to the audio processing/controlling device and the detector. The mixing device is used for receiving the N rear sub-audio signals from the audio processing/controlling device and processing the N rear sub-audio signals into at least one mixed audio signal. After the detector receives the at least one mixed audio signal from the mixing device, the detector will transmit the at least one mixed audio signal via the external upgrading/transmitting device.

In this embodiment, the rear audio playback apparatus comprises an antenna, a receiving device, an anti-mixing device, and N rear loudspeakers. The receiving device receives the at least one mixed audio signal via the antenna. The anti-mixing device processes the at least one mixed audio signal into the N rear sub-audio signals and outputs each of the N rear sub-audio signals respectively. Each of the rear loudspeakers is corresponding to one of the N rear sub-audio signals and is used to receive and playback the corresponding rear sub-audio signal respectively.

The advantage and spirit of the invention may be understood by the following recitations together with the appended drawings.

DETAILED DESCRIPTION OF THE INVENTION

The invention provides a novel multimedia system. The multimedia system according to the invention can transmit an audio signal in a wireless way between an audio processing/controlling device and rear loudspeakers. A user can easily upgrade a conventional 2-channel stereo multimedia system to a 5.1-channel stereo multimedia system by inserting an upgrading/transmitting card into the multimedia system.

In addition, the upgrading/transmitting card can also be used for wirelessly transmitting the audio signal from the audio processing/controlling device to the rear loudspeakers. It is convenient for the user to freely choose to use the multimedia system as a conventional 2-channel (or 2.1-channel) stereo or upgrade the multimedia system to be a 5.1-channel stereo in a simple way.

Figure 1:
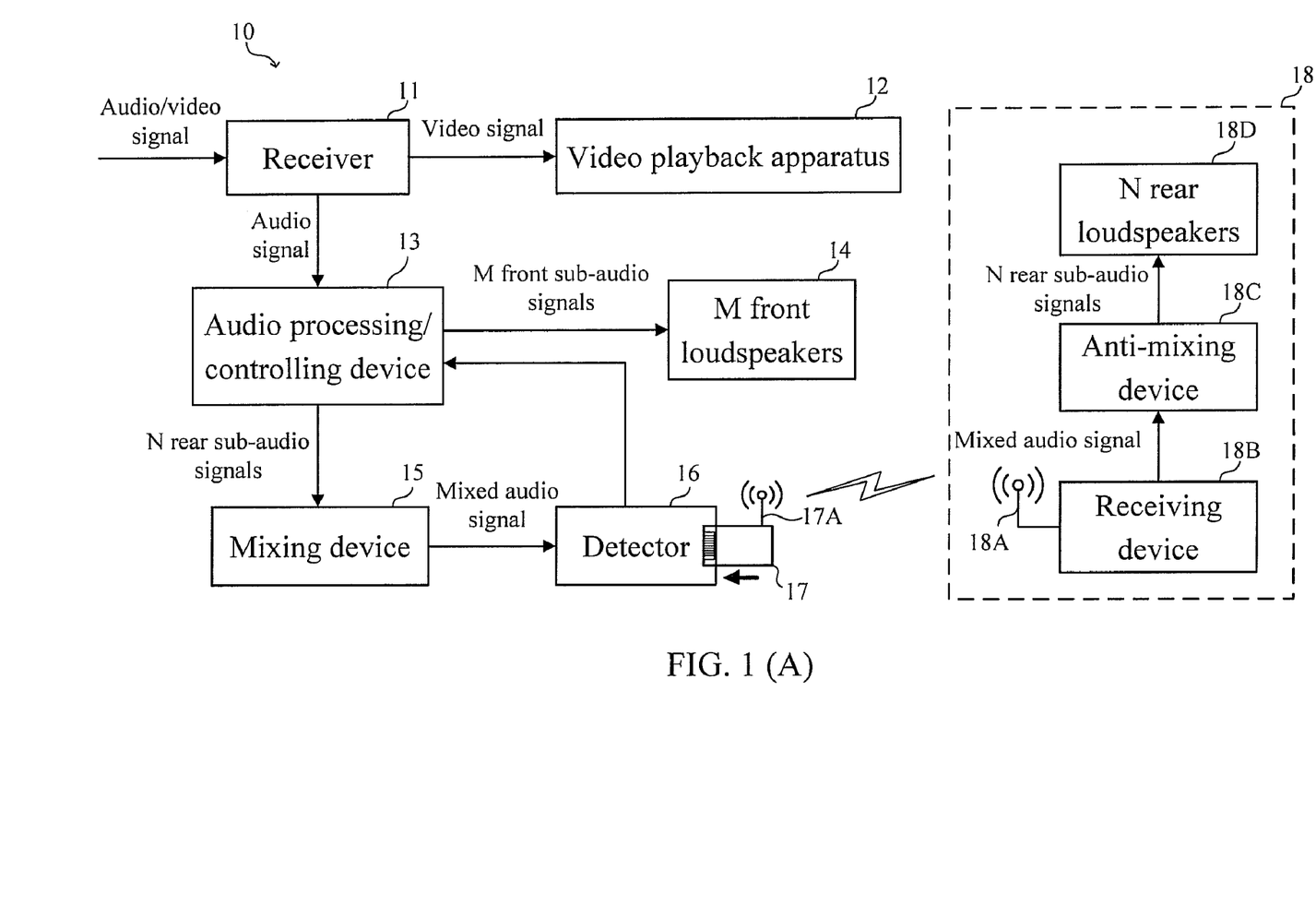
FIG. 1(A) is a functional block diagram of the multimedia television system according to the first embodiment of the invention.
FIG. 1(B) is a functional block diagram of the detector shown in FIG. 1(A).

A first embodiment according to the invention is a multimedia television system. Please refer to FIG. 1(A). FIG. 1(A) shows a functional block diagram of the multimedia television system. As shown in FIG. 1(A), the multimedia television system 10 comprises a receiver 11, a video playback apparatus 12, an audio processing/controlling device 13, M front loudspeakers 14, a mixing device 15, a detector 16, an external upgrading/transmitting device 17, and a rear audio playback apparatus 18. In this embodiment, the external upgrading/transmitting device 17 comprises an antenna 17A; the rear audio playback apparatus 18 comprises an antenna 18A, a receiving device 18B, an anti-mixing device 18C, and N rear loudspeakers 18D.

In practical applications, the external upgrading/transmitting device 17 can be a pluggable card device, such as a SD (secure digital) card, a MMC (multimedia card), an xD (extreme digital) card, or any other type of pluggable card device.

In this embodiment, the receiver 11 is used to receive an audio/video signal; the audio/video signal comprises an audio signal and a video signal. And, the receiver 11 will output the audio signal and the video signal respectively. The video playback apparatus 12 is coupled to the receiver 11 and used to receive and display the video signal outputted by the receiver 11.

Then, the practical operating conditions of the multimedia television system 10 according to whether the external upgrading/transmitting device 17 is inserted into the detector 16 will be discussed. In this embodiment, if the external upgrading/transmitting device 17 is not inserted into the detector 16, the multimedia television system 10 will function just as a conventional 2-channel (or 2.1-channel) stereo multimedia television system.

At this time, the audio processing/controlling device 13 receives the audio signal outputted by the receiver 11 and processes the audio signal into a multi-channel audio signal comprising M front sub-audio signals, wherein M is a positive integer. Then, the audio processing/controlling device 13 will output the M front sub-audio signals to the M front loudspeakers 14. Each of the M front loudspeakers 14 corresponds to one of the M front sub-audio signals and is used to receive and playback the corresponding front sub-audio signal respectively.

On the other hand, if the external upgrading/transmitting device 17 is inserted into the detector 16, the multimedia television system 10 will be upgraded from the conventional 2-channel (or 2.1-channel) stereo multimedia television system to a 5.1-channel (or even more channels) stereo multimedia television system.

As shown in FIG. 1(B), the detector 16 comprises a connecting module 161 and a detecting module 162. If the external upgrading/transmitting device 17 is inserted into the connecting module 161 of the detector 16, the detecting module 162 will detect the insertion of the external upgrading/transmitting device 17 and generate an upgrading signal to the audio processing/controlling device 13. In practical applications, the detection of the external upgrading/transmitting device 17 can be realized by the hardware or firmware of the multimedia television system 10.

After the audio processing/controlling device 13 receives the upgrading signal from the detector 16, the audio processing/controlling device 13 will process the audio signal into a multi-channel audio signal according to the upgrading signal. The multi-channel audio signal comprises M front sub-audio signals and N rear sub-audio signals, wherein M and N are positive integers.

Then, the audio processing/controlling device 13 will output the M front sub-audio signals to the M front loudspeakers 14 and output the N rear sub-audio signals to the mixing device 15. Each of the M front loudspeakers 14 corresponds to one of the M front sub-audio signals and is used to receive and playback the corresponding front sub-audio signal respectively.

After the mixing device 15 receives the N rear sub-audio signals from the audio processing/controlling device 13, the mixing device 15 will process the N rear sub-audio signals into at least one mixed audio signal and transmit the at least one mixed audio signal to the detector 16. Since the external upgrading/transmitting device 17 is connected to the detector 16, the detector 16 will transmit the at least one mixed audio signal to the external upgrading/transmitting device 17. Then, the external upgrading/transmitting device 17 will wirelessly transmit the at least one mixed audio signal to the rear audio playback apparatus 18.

As shown in FIG. 1(A), the rear audio playback apparatus 18 comprises an antenna 18A, a receiving device 18B, an anti-mixing device 18C, and N rear loudspeakers 18D. In this embodiment, the receiving device 18B is used for receiving the at least one mixed audio signal via the antenna 18A. The anti-mixing device 18C is coupled to the receiving device 18B and used for receiving the at least one mixed audio signal from the receiving device 18B and processing the at least one mixed audio signal into the N rear sub-audio signals. The N rear loudspeakers 18D are coupled to the anti-mixing device 18C. Each of the N rear loudspeakers 18D corresponds to one of the N rear sub-audio signals and is used to receive and playback the corresponding rear sub-audio signal respectively.

Figure 2:
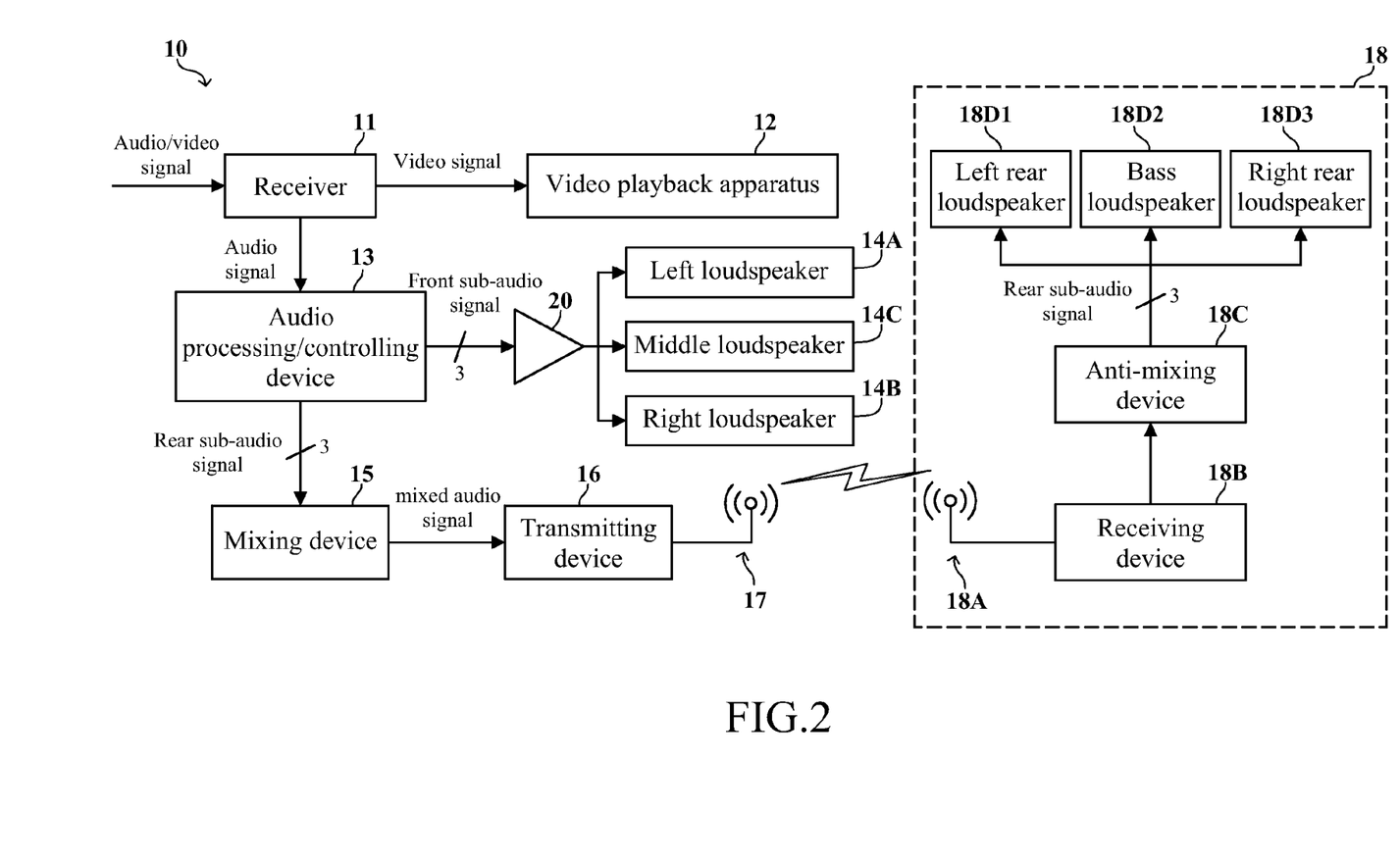
FIG. 2 is a functional block diagram of the multimedia television system including a three-channel amplifier.

In this embodiment, if the multimedia television system 10 is a 5.1-channel stereo multimedia television system, both M and N will equal to 3. That is to say, the multimedia television system 10 totally comprises three front loudspeakers 14 and three rear loudspeakers 18D. As shown in FIG. 2, the three front loudspeakers 14 are a left loudspeaker 14A, a right loudspeaker 14B, and a middle loudspeaker 14C respectively; the three rear loudspeakers 18D are a left rear loudspeaker 18D1, a bass loudspeaker 18D2, and a right rear loudspeaker 18D3 respectively.

In addition, the three rear sub-audio signals can comprise a first rear sub-audio signal corresponding to the left rear loudspeaker 18D1, a second rear sub-audio signal corresponding to the bass loudspeaker 18D2, and a third rear sub-audio signal corresponding to the right rear loudspeaker 18D3.

In practical applications, the multimedia television system 10 can further comprise a three-channel amplifier 20, as shown in FIG. 2. In this embodiment, the three-channel amplifier 20 is coupled between the audio processing/controlling device 13 and the three front loudspeakers 14A~14C. The three-channel amplifier 20 is used to amplify the three front sub-audio signals before the three front sub-audio signals are transmitted to the three front loudspeakers 14A~14C.

Figure 3:
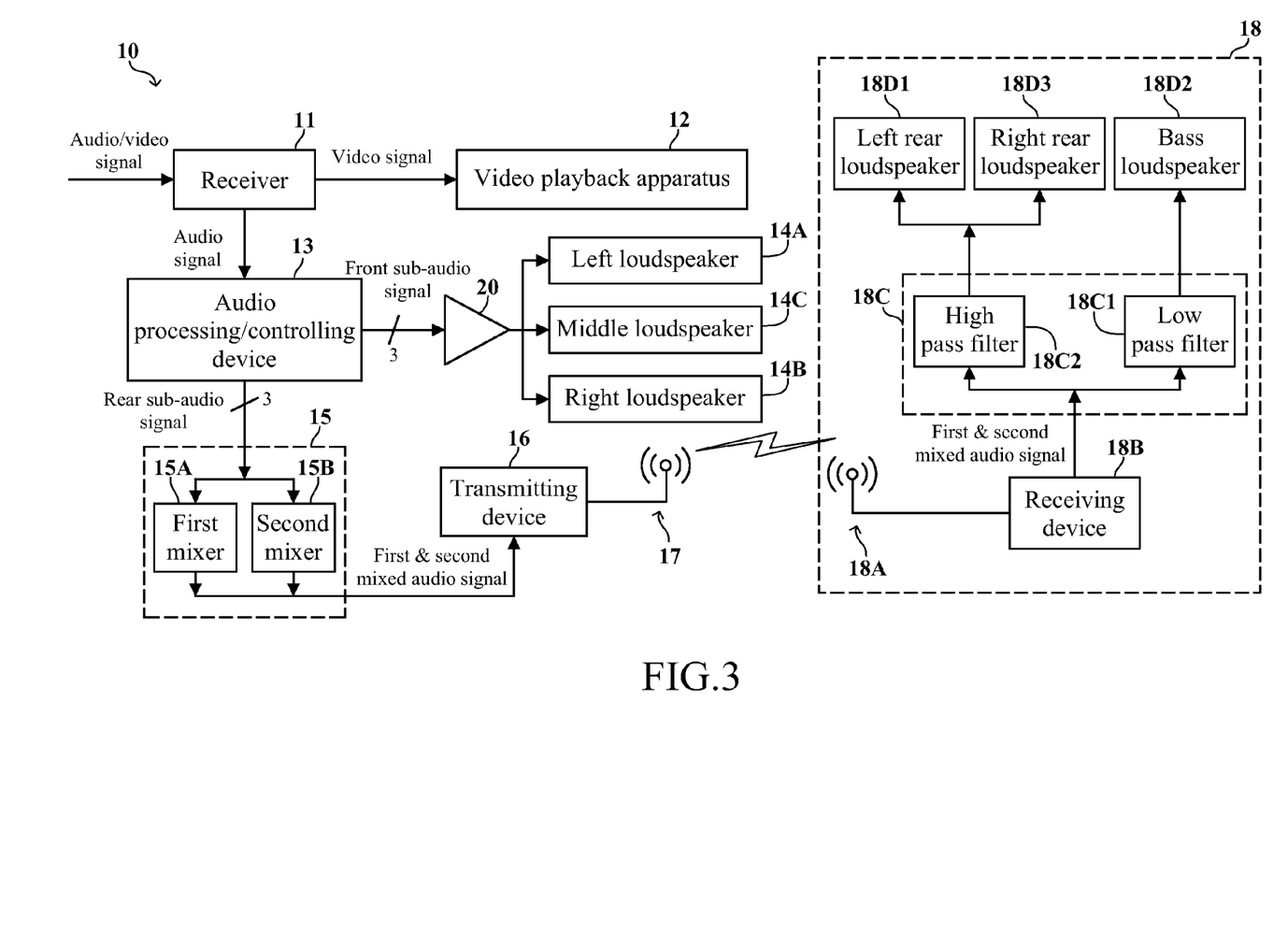
FIG. 3 is a functional block diagram of the multimedia television system including a first mixer and a second mixer.

As shown in FIG. 3, the mixing device 15 can comprise a first mixer 15A and a second mixer 15B. The first mixer 15A is used to receive the first rear sub-audio signal and the second rear sub-audio signal from the audio processing/controlling device 13, and to mix the first rear sub-audio signal and the second rear sub-audio signal into a first mixed audio signal of the at least one mixed audio signal. And, the second mixer 15B is used to receive the second rear sub-audio signal and the third rear sub-audio signal from the audio processing/controlling device 13, and to mix the second rear sub-audio and the third rear sub-audio signal into a second mixed audio signal of the at least one mixed audio signal. Then, the first mixed audio signal and the second mixed audio signal will be transmitted to the detector 16.

In addition, the anti-mixing device 18C can relatively comprise a low-pass filter 18C1 and at least one high-pass filter 18C2, as shown in FIG. 3. The low-pass filter 18C1 is coupled between the receiving device 18B and the bass loudspeaker 18D2, and used to filter the first mixed audio signal and the second mixed audio signal to obtain the second rear sub-audio signal and transmit the second rear sub-audio signal to the bass loudspeaker 18D2.

Moreover, the high-pass filter 18C2 is coupled among the receiving device 18B, the left rear loudspeaker 18D1, and the right rear loudspeaker 18D3. The high-pass filter 18C2 is used to filter the first mixed audio signal and/or the second mixed audio signal to selectively obtain the first rear sub-audio signal and/or the third rear sub-audio signal. Then, the high-pass filter 18C2 will transmit the first rear sub-audio signal to the left rear loudspeaker 18D1 and transmit the third rear sub-audio signal to the right rear loudspeaker 18D3.

Figure 4:
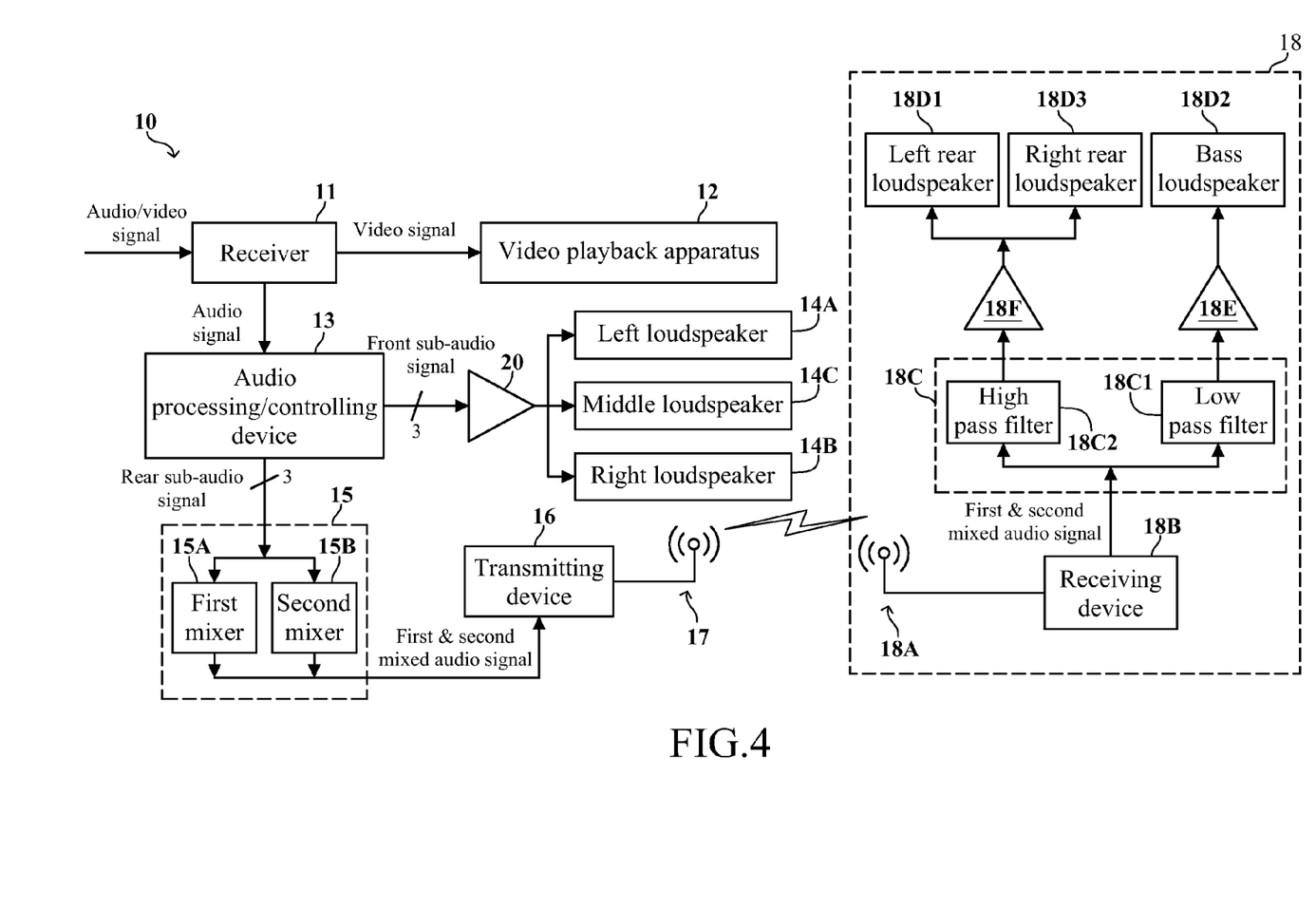
FIG. 4 is a functional block diagram of the multimedia television system including a first amplifier and at least one second amplifier.

As shown in FIG. 4, the rear audio playback apparatus 18 can further comprise a first amplifier 18E and at least one second amplifier 18F. The first amplifier 18E is coupled between the low-pass filter 18C1 and the bass loudspeaker 18D2, and used to amplify the second rear sub-audio signal transmitted from the low-pass filter 18C1 to the bass loudspeaker 18D2. Moreover, the second amplifier 18F is coupled among the high-pass filter 18C2, the left rear loudspeaker 18D1, and the right rear loudspeaker 18D3, and used to amplify the first rear sub-audio signal and the third rear sub-audio signal transmitted from the high-pass filter 18C2 to the left rear loudspeaker 18D1 and the right rear loudspeaker 18D3 respectively.

It should be noticed that if the external upgrading/transmitting device 17 is inserted into the detector 16, the multimedia television system 10 will be upgraded from the conventional 2-channel stereo multimedia television system to the 5.1-channel stereo multimedia television system. Then, the multimedia television system 10 will show the stereo modes of the 5.1-channel stereo and the 2-channel (or 2.1-channel) stereo on the on screen display (OSD) of the multimedia television system 10. Therefore, the user can operate the OSD of the multimedia television system 10 to choose one from the 5.1-channel stereo mode and the 2-channel (or 2.1-channel) stereo mode.

Figure 5:
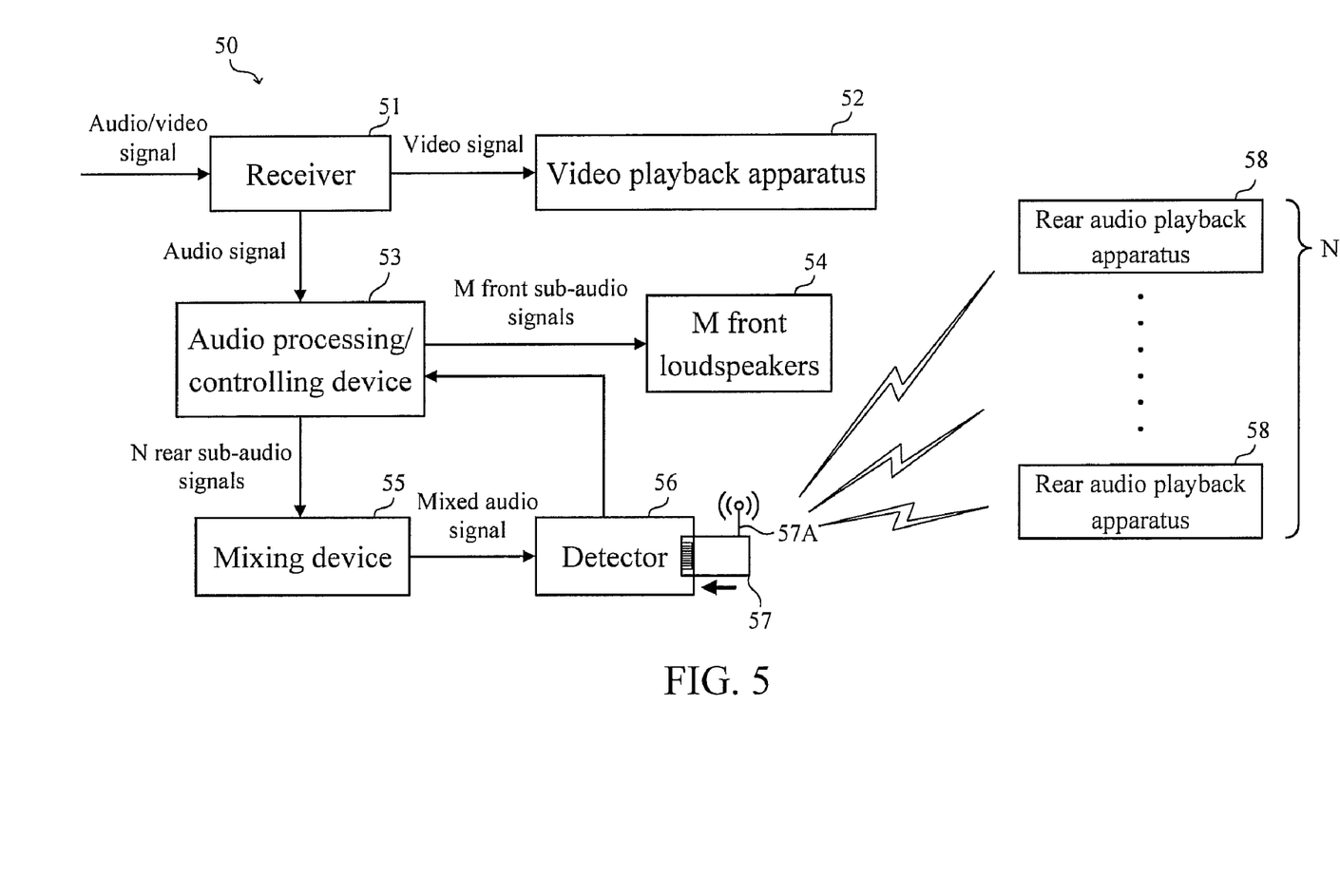
FIG. 5 is a functional block diagram of the multimedia television according to the second embodiment of the invention.

A second embodiment according to the invention is also a multimedia television system. Please refer to FIG. 5. FIG. 5 shows a functional block diagram of the multimedia television system. As shown in FIG. 5, the multimedia television system 50 comprises a receiver 51, a video playback apparatus 52, an audio processing/controlling device 53, M front loudspeakers 54, a mixing device 55, a detector 56, an external upgrading/transmitting device 57, and N rear audio playback apparatus 58. The external upgrading/transmitting device 57 comprises an antenna 57A. In practical applications, the external upgrading/transmitting device 57 can be a pluggable card device, such as a SD card, a MMC, an xD card, or any other type of pluggable card device.

In this embodiment, the receiver 51 is used to receive an audio/video signal; the audio/video signal comprises an audio signal and a video signal. And, the receiver 51 will output the audio signal and the video signal respectively. The video playback apparatus 52 is coupled to the receiver 51 and used to receive and display the video signal outputted by the receiver 51.

If the external upgrading/transmitting device 57 is not inserted into the detector 56, the multimedia television system 50 will function as a conventional 2-channel (or 2.1-channel) stereo multimedia television. At this time, only the M front loudspeakers 54 are used to playback the audio signal, and the N rear audio playback apparatus 58 are not functioned. After the audio processing/controlling device 53 receives the audio signal outputted by the receiver 51, the audio processing/controlling device 53 will process the audio signal into a multi-channel audio signal comprising M front sub-audio signals, wherein M is a positive integer. Then, the audio processing/controlling device 53 outputs the M front sub-audio signals to the M front loudspeakers 54. Each of the M front loudspeakers 54 corresponds to one of the M front sub-audio signals and is used to receive and playback the corresponding front sub-audio signal respectively.

If the external upgrading/transmitting device 57 is inserted into the detector 56, the multimedia television system 50 will be upgraded from the conventional 2-channel stereo multimedia television system to the 5.1-channel stereo multimedia television system. When the external upgrading/transmitting device 57 is inserted into the detector 56, the detector 56 detects the insertion of the external upgrading/transmitting device 57 and generates an upgrading signal to the audio processing/controlling device 53.

After the audio processing/controlling device 53 receives the upgrading signal from the detector 56, the audio processing/controlling device 53 will process the audio signal into a multi-channel audio signal according to the upgrading signal. The multi-channel audio signal comprises M front sub-audio signals and N rear sub-audio signals, wherein M and N are positive integers.

Then, the audio processing/controlling device 53 will output the M front sub-audio signals to the M front loudspeakers 54 and output the N rear sub-audio signals to the mixing device 55. Each of the M front loudspeakers 54 corresponds to one of the M front sub-audio signals and is used to receive and playback the corresponding front sub-audio signal respectively.

After the mixing device 55 receives the N rear sub-audio signals from the audio processing/controlling device 53, the mixing device 55 will process the N rear sub-audio signals into at least one mixed audio signal and transmit the at least one mixed audio signal to the detector 56. Since the external upgrading/transmitting device 57 is connected to the detector 56, the detector 56 will transmit the at least one mixed audio signal to the external upgrading/transmitting device 57. Then, the external upgrading/transmitting device 57 will wirelessly transmit the at least one mixed audio signal to the N rear audio playback apparatus 58 via the antenna 57A.

Figure 6:
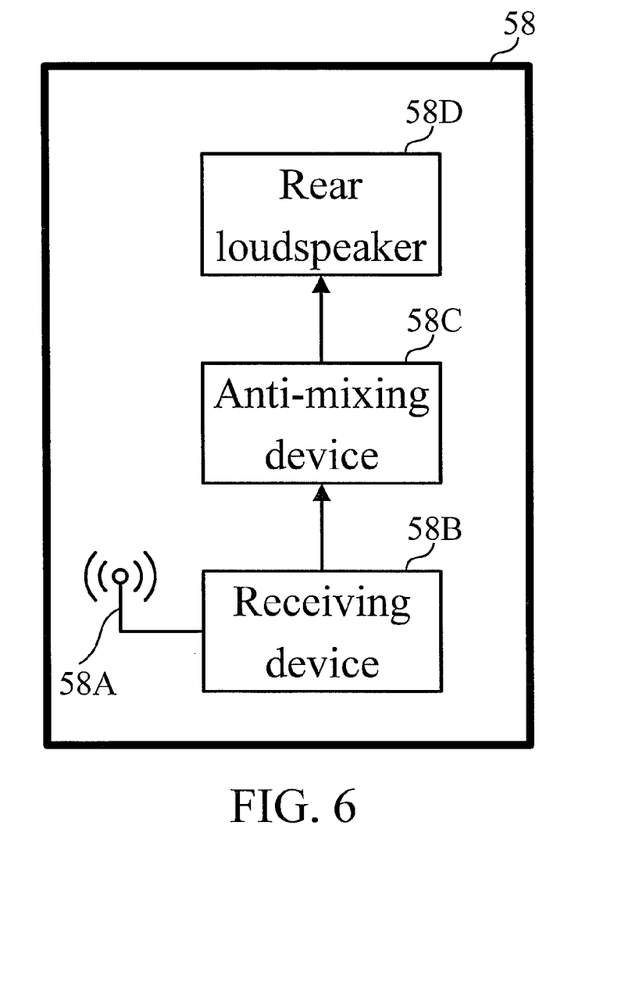
FIG. 6 is a functional block diagram of the rear audio playback apparatus shown in FIG. 5.

Please refer to FIG. 6. FIG. 6 shows the functional block diagram of the rear audio playback apparatus 58 shown in FIG. 5. As shown in FIG. 6, each of the N rear audio playback apparatus 58 comprises an antenna 58A, a receiving device 58B, an anti-mixing device 58C, and a rear loudspeaker 58D respectively. In addition, each of the N rear audio playback apparatus 58 corresponds to one of the N rear sub-audio signals respectively.

In this embodiment, the receiving device 58B of the rear audio playback apparatus 58 is used to receive the at least one mixed audio signal via the antenna 58A. Then, the anti-mixing device 58C will receive and filter the at least one mixed audio signal from the receiving device 58B to obtain the corresponding rear sub-audio signals of the rear audio playback apparatus 58. And, the rear loudspeaker 58D is used to playback the corresponding rear sub-audio signal received from the anti-mixing device 58C.

Figure 7:
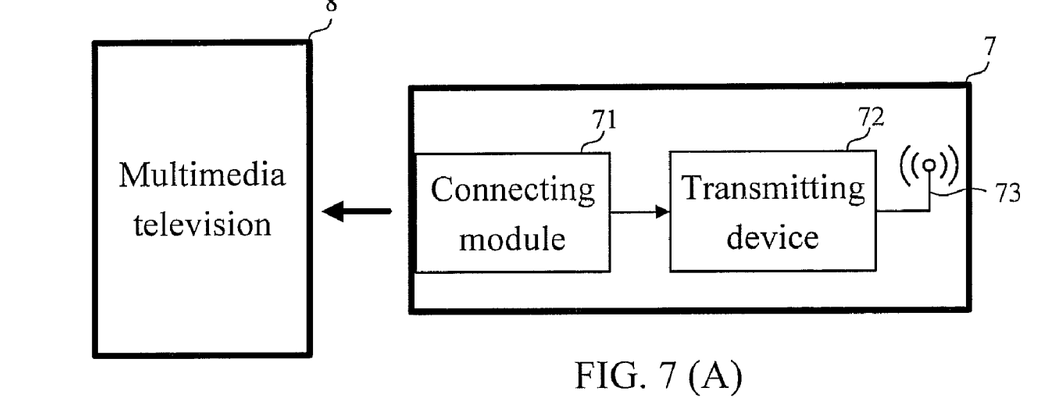
FIG. 7(A) and FIG. 7(B) show the functional block diagram of the pluggable upgrading/transmitting device according to the third embodiment of the invention.

A third embodiment according to the invention is a pluggable upgrading/transmitting device applied to a multimedia television system. In this embodiment, the multimedia television system comprises a multimedia television and at least one rear audio playback apparatus. The multimedia television receives an audio signal. Please refer to FIG. 7. FIG. 7 is a functional block diagram of the pluggable upgrading/transmitting device.

As shown in FIG. 7, the pluggable upgrading/transmitting device 7 comprises a connecting module 71, a transmitting module 72, and an antenna 73. When the pluggable upgrading/transmitting device 7 is inserted into the multimedia television 8, the connecting module 71 of the pluggable upgrading/transmitting device 7 is connected to the multimedia television 8. After the multimedia television 8 detects the insertion of the connecting module 71, the multimedia television 8 will generate at least one mixed audio signal according to the audio signal. And, the at least one mixed audio signal will be transmitted to the connecting module 71 of the pluggable upgrading/transmitting device 7.

In practical applications, the detection of the connecting module 71 of the pluggable upgrading/transmitting device 7 can be realized by the hardware or firmware of the multimedia television 8.

In this embodiment, after the connecting module 71 receives the at least one mixed audio signal, the transmitting module 72 will receive the at least one mixed audio signal from the connecting module 71 and emit the at least one mixed audio signal to the N rear audio playback apparatus 9 via the antenna 73, wherein N is a positive integer. In fact, the operation of each of the N rear audio playback apparatus 9 is similar to that of the rear audio playback apparatus 58 in FIG. 6. Therefore, it is not repeated here.

In practical applications, the pluggable upgrading/transmitting device 7 can be a pluggable card device, such as a SD card, a MMC, an xD card, or any other type of pluggable card device.

To sum up, the multimedia television system according to the invention can provide not only a conventional 2-channel stereo (or a 2.1-channel stereo), but also a 4.1-channel stereo, a 5.1-channel stereo, a 7.1-channel stereo, or even more channels. And, the only difference among them is the various values of M and N. A user can easily upgrade the conventional 2-channel stereo multimedia system to the 5.1-channel stereo multimedia system only by inserting an upgrading/transmitting card into the multimedia system.

In addition, the upgrading/transmitting card can also be used for wirelessly transmitting the audio signal from the audio processing/controlling device to the rear loudspeakers. It is convenient for the user to freely choose to use the multimedia system only as a conventional 2-channel (or 2.1-channel) stereo or upgrade the multimedia system to be a 5.1-channel stereo in a simple way.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A multimedia television system comprising:
a receiver for receiving an audio/video signal comprising an audio signal and a video signal and outputting the audio signal and the video signal respectively;
a detector, when an external upgrading/transmitting device is connected to the detector, the detector generating an upgrading signal;
an audio processing/controlling device coupled to the receiver and the detector, when the audio processing/controlling device receives the upgrading signal from the detector, the audio processing/controlling device receiving the audio signal from the receiver and processing the audio signal into a multi-channel audio signal according to the upgrading signal, wherein the multi-channel audio signal comprises M front sub-audio signals and N rear sub-audio signals, M and N are positive integers; and
a mixing device coupled to the audio processing/controlling device and the detector, for receiving the N rear sub-audio signals from the audio processing/controlling device and processing the N rear sub-audio signals into at least one mixed audio signal;
wherein after the detector receives the at least one mixed audio signal from the mixing device, the detector will transmit the at least one mixed audio signal via the external upgrading/transmitting device.

2. The multimedia television system of claim 1, wherein the external upgrading/transmitting device is a pluggable card device comprising an antenna for transmitting the at least one mixed audio signal.

3. The multimedia television system of claim 1, wherein the detector comprises:
a connecting module; and
a detecting module coupled to the connecting module, when the external upgrading/transmitting device is inserted into the connecting module, the detecting module generating an upgrading signal.

4. The multimedia television system of claim 1, further comprising:
a video playback apparatus coupled to the receiver, for receiving the video signal from the receiver and displaying the video signal.

5. The multimedia television system of claim 1, further comprising:
M front loudspeakers coupled to the audio processing/controlling device, each of the M front loudspeakers corresponding to one of the M front sub-audio signals and being used to receive and playback the corresponding front sub-audio signal respectively.

6. The multimedia television system of claim 5, wherein M equals to 3 and the three front loudspeakers comprise a left loudspeaker, a right loudspeaker, and a middle loudspeaker.

7. The multimedia television system of claim 6, further comprising:
a three-channel amplifier coupled between the audio processing/controlling device and the three front loudspeakers, for amplifying the three front sub-audio signals.

8. The multimedia television system of claim 1, further comprising:
a rear audio playback apparatus, comprising:
an antenna;
a receiving device coupled to the antenna, for receiving the at least one mixed audio signal via the antenna;
an anti-mixing device coupled to the receiving device, for receiving the at least one mixed audio signal from the receiving device and processing the at least one mixed audio signal into the N rear sub-audio signals; and N rear loudspeakers, each of the N rear loudspeakers corresponding to one of the N rear sub-audio signals respectively and being used to receive and playback the corresponding rear sub-audio signal.

9. The multimedia television system of claim 8, wherein N equals to 3 and the three rear loudspeakers comprise a left rear loudspeaker, a bass loudspeaker, and a right rear loudspeaker, the three rear sub-audio signals comprise a first rear sub-audio signal corresponding to the left rear loudspeaker, a second rear sub-audio signal corresponding to the bass loudspeaker, and a third rear sub-audio signal corresponding to the right rear loudspeaker.

10. The multimedia television system of claim 9, wherein the mixing device comprises:
a first mixer for receiving the first rear sub-audio signal and the second rear sub-audio signal and mixing the first rear sub-audio signal and the second rear sub-audio signal into a first mixed audio signal of the at least one mixed audio signal; and
a second mixer for receiving the second rear sub-audio signal and the third rear sub-audio signal and mixing the second rear sub-audio signal and the third rear sub-audio signal into a second mixed audio signal of the at least one mixed audio signal.

11. The multimedia television system of claim 10, wherein the anti-mixing device comprises:
a low-pass filter coupled between the receiving device and the bass loudspeaker and being used to filter the first mixed audio signal and the second mixed audio signal to obtain the second rear sub-audio signal; and
one or two high-pass filter coupled among the receiving device, the left rear loudspeaker and the right rear loudspeaker and being used to filter the first mixed audio signal and/or the second mixed audio signal to selectively obtain the first rear sub-audio signal and/or the third rear sub-audio signal.

12. The multimedia television system of claim 11, wherein the rear audio playback apparatus further comprises:
a first amplifier coupled between the low-pass filter and the bass loudspeaker and being used to amplify the second rear sub-audio signal; and
one or two second amplifier electrically being connected among the high-pass filter, the left rear loudspeaker and the right rear loudspeaker and being used to amplify the first rear sub-audio signal and the third rear sub-audio signal.

13. The multimedia television system of claim 1, further comprising:
N rear audio playback apparatus, each of the rear audio playback apparatus corresponding to one of the N rear sub-audio signals and respectively comprising:
an antenna;
a receiving device coupled to the antenna, for receiving the at least one mixed audio signal via the antenna;
an anti-mixing device coupled to the receiving device and the receiving device receiving and filtering the at least one mixed audio signal to obtain the corresponding rear sub-audio signals; and
a rear loudspeaker for receiving and playback the corresponding rear sub-audio signal.

14. The multimedia television system of claim 13, wherein M equals to 3 and the three front loudspeakers comprise a left loudspeaker, a right loudspeaker, and a middle loudspeaker.

15. The multimedia television system of claim 14, further comprises:
a three-channel amplifier, coupled between the audio processing/controlling device and the three front loudspeakers, for amplifying the three front sub-audio signals.

16. The multimedia television system of claim 13, wherein N equals to 3 and the three rear loudspeakers comprise a left rear loudspeaker, a bass loudspeaker, and a right rear loudspeaker, the three rear sub-audio signals comprise a first rear sub-audio signal corresponding to the left rear loudspeaker, a second rear sub-audio signal corresponding to the bass loudspeaker, and a third rear sub-audio signal corresponding to the right rear loudspeaker.

17. The multimedia television system of claim 16, wherein the mixing device comprises:
a first mixer for receiving the first rear sub-audio signal and the second rear sub-audio signal and mixing the first rear sub-audio signal and the second rear sub-audio signal into a first mixed audio signal of the at least one mixed audio signal; and
a second mixer for receiving the second rear sub-audio signal and the third rear sub-audio signal, and mixing the second rear sub-audio signal and the third rear sub-audio signal into a second mixed audio signal of the at least one mixed audio signal.

18. The multimedia television system of claim 17, wherein the anti-mixing device is a low-pass filter in the rear audio playback apparatus comprising the bass loudspeaker, and the anti-mixing devices is a high-pass filter respectively in the rear audio playback apparatus comprising the left rear loudspeaker and the right rear loudspeaker.

19. The multimedia television system of claim 18, wherein each of the rear audio playback apparatus further comprises an amplifier that is coupled between the low/high-pass filter and the rear loudspeaker, and the amplifier is used to amplify the corresponding rear sub-audio signal.

20. A pluggable upgrading/transmitting device, applied to a multimedia television system, the multimedia television system comprising a multimedia television and at least one rear audio playback apparatus, the multimedia television receiving an audio signal, the pluggable upgrading/transmitting device comprising:
a connecting module, when the connecting module is connected to the multimedia television, the multimedia television generating at least one mixed audio signal according to the audio signal and transmitting the at least one mixed audio signal to the connecting module;
an antenna; and
a transmitting module coupled to the connecting module and the antenna, for receiving the at least one mixed audio signal from the connecting module and emitting the at least one mixed audio signal to the at least one rear audio playback apparatus via the antenna.

* * * * *